(12) United States Patent
Berkley

(10) Patent No.: US 8,018,244 B2
(45) Date of Patent: Sep. 13, 2011

(54) ARCHITECTURE FOR LOCAL PROGRAMMING OF QUANTUM PROCESSOR ELEMENTS USING LATCHING QUBITS

(75) Inventor: Andrew Joseph Berkley, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 0 days.

(21) Appl. No.: 12/909,682

(22) Filed: Oct. 21, 2010

(65) Prior Publication Data

US 2011/0031994 A1 Feb. 10, 2011

Related U.S. Application Data

(63) Continuation of application No. 12/109,847, filed on Apr. 25, 2008, now Pat. No. 7,843,209.

(60) Provisional application No. 60/913,980, filed on Apr. 25, 2007.

(51) Int. Cl.
*H03K 19/195* (2006.01)

(52) U.S. Cl. .................................. 326/7; 326/1

(58) Field of Classification Search .............. 326/1–7
See application file for complete search history.

(56) References Cited

U.S. PATENT DOCUMENTS

| | | | | |
|---|---|---|---|---|
| 4,275,314 | A | 6/1981 | Fulton | 307/462 |
| 6,784,451 | B2 | 8/2004 | Amin et al. | 257/34 |
| 6,838,694 | B2 | 1/2005 | Esteve et al. | 257/34 |
| 6,984,846 | B2 | 1/2006 | Newns et al. | 257/31 |
| 7,335,909 | B2 | 2/2008 | Amin et al. | 257/34 |
| 7,843,209 | B2 * | 11/2010 | Berkley | 326/7 |
| 2002/0060635 | A1 | 5/2002 | Gupta | 341/133 |
| 2005/0082519 | A1 | 4/2005 | Amin et al. | 257/13 |
| 2006/0147154 | A1 | 7/2006 | Thom et al. | 385/37 |
| 2006/0225165 | A1 | 10/2006 | Maassen van den Brink et al. | 977/933 |
| 2006/0248618 | A1 | 11/2006 | Berkley | 977/700 |
| 2009/0078931 | A1 | 3/2009 | Berkley | 257/31 |
| 2009/0082209 | A1 | 3/2009 | Bunyk et al. | 505/190 |
| 2009/0322374 | A1 * | 12/2009 | Przybysz et al. | 326/5 |

FOREIGN PATENT DOCUMENTS

SU 539333 12/1976

OTHER PUBLICATIONS

U.S. Appl. No. 11/950,276, filed Dec. 4, 2007, Berkley et al.
U.S. Appl. No. 12/013,192, filed Jan. 11, 2008, Rose et al.
U.S. Appl. No. 12/017,995, filed Jan. 22, 2008, Harris.
U.S. Appl. No. 12/109,847, filed Apr. 25, 2008, Berkley.
U.S. Appl. No. 60/913,980, filed Apr. 25, 2007, Berkley.
U.S. Appl. No. 60/917,884, filed May 14, 2007, Berkley et al.

(Continued)

*Primary Examiner* — Don P Le

(74) *Attorney, Agent, or Firm* — Seed IP Law Group PLLC

(57) ABSTRACT

An architecture for a quantum processor may include a set of superconducting flux qubits operated as computation qubits and a set of superconducting flux qubits operated as latching qubits. Latching qubits may include a first closed superconducting loop with serially coupled superconducting inductors, interrupted by a split junction loop with at least two Josephson junctions; and a clock signal input structure configured to couple clock signals to the split junction loop. Flux-based superconducting shift registers may be formed from latching qubits and sets of dummy latching qubits. The devices may include clock lines to clock signals to latch the latching qubits. Thus, latching qubits may be used to program and configure computation qubits in a quantum processor.

24 Claims, 7 Drawing Sheets

OTHER PUBLICATIONS

U.S. Appl. No. 60/917,891, filed May 15, 2007, Bunyk et al.
U.S. Appl. No. 60/975, 487, filed Sep. 26, 2007, Maibaum et al.
U.S. Appl. No. 60/986,554, filed Nov. 8, 2007, Choi.
U.S. Appl. No. 61/039,710, filed Mar. 26, 2008, Maibaum et al.
Blatter et al., "Design aspects of superconducting-phase quantum bits," *Physical Review B 63*:174511-1-174511-9, 2001.
Farhi et al., "Quantum Adiabatic Evolution Algorithms versus Simulated Annealing," MIT-CTP #3228, arXiv:quant-ph/0201031 v1, pp. 1-16, Jan. 8, 2002.
Feynman, "Simulating Physics with Computers," *International Journal of Theoretical Physics 21*(6/7):467-488, 1982.
Friedman et al., "Quantum superposition of distinct macroscopic states," *Nature 406*:43-46, Jul. 6, 2000.
Harris et al., "Sign and Magnitude Tunable Coupler for Superconducting Flux Qubits," arXiv:cond-mat/0608253 v1, Aug. 11, 2006.
Hioe et al., *Quantum Flux Parametron—A Single Quantum Flux Superconducting Logic Device*, World Scientific Publishing Co. Pte. Ltd., Singapore, 1991, pp. 23-41.
Il'ichev et al., "Continuous Monitoring of Rabi Oscillations in a Josephson Flux Qubit," *Physical Review Letters 91*(9):097906-1-097906-4, week ending Aug. 29, 2003.
Inokuchi et al., "Analog Computation Using Quantum-Flux Parametron Devices," *Physica C 357-360*:1618-1621, 2001.
Likharev et al., "Reversible Conveyer Computation in Array of Parametric Quantrons," *IEEE Transactions on Magnetics MAG-21*(2):947-950, 1985.
Likharev, "Classical and Quantum Limitations on Energy Consumption in Computation," *International Journal of Theoretical Physics 21*(3/4):311-326, 1982.
Likharev, "Dynamics of Some Single Flux Quantum Devices: I. Parametric Quatron," *IEEE Transactions on Magnetics MAG-13*(1):242-244, 1977.
Makhlin et al., "Quantum-State Engineering with Josephson-Junction Devices," *Reviews of Modern Physics 73*(2):357-400, Apr. 2001.
Mooij et al., "Josephson Persistent-Current Qubit," *Science 285*:1036-1039, Aug. 13, 1999.
Nielsen et al., *Quantum Computation and Quantum Information*, Cambridge University Press, Cambridge, 2000, "7.8 Other implementation schemes," pp. 343-345.
Orlando et al., "Superconducting Persistent-Current Qubit," *Physical Review B 60*(22):15 398-15 413, Dec. 1, 1999.
Semenov et al., "Classical and Quantum Operation Modes of the Reversible Logic Circuits," Department of Physics and Astronomy, Stony Brook University, Stony Brook, New York, Presentation, Dec. 2006, 29 pages.
Shor, "Introduction to Quantum Algorithms," AT&T Labs—Research, arXiv:quant-ph/0005003 v2, pp. 1-17, Jul. 6, 2001.
Berkley, "Architecture for Local Programming of Quantum Processor Elements Using Latching Qubits," Notice of Allowance mailed Jul. 23, 2010 for U.S. Appl. No. 12/109,847, 8 pages.
Berkley, "Architecture for Local Programming of Quantum Processor Elements Using Latching Qubits," Amendment After Allowance filed Oct. 19, 2010 for U.S. Appl. No. 12/109,847, 7 pages.

\* cited by examiner

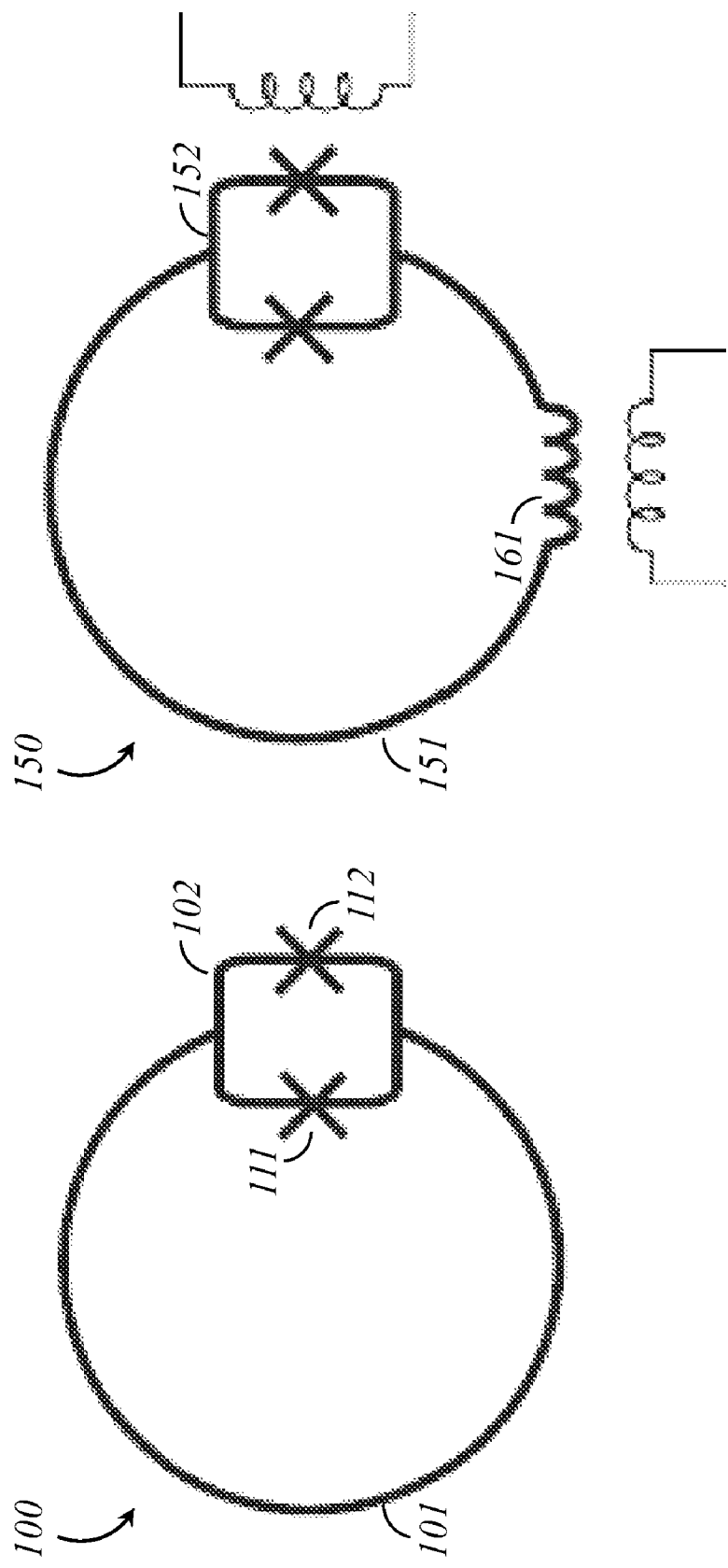
PRIOR ART
FIGURE 1A
PRIOR ART
FIGURE 1B

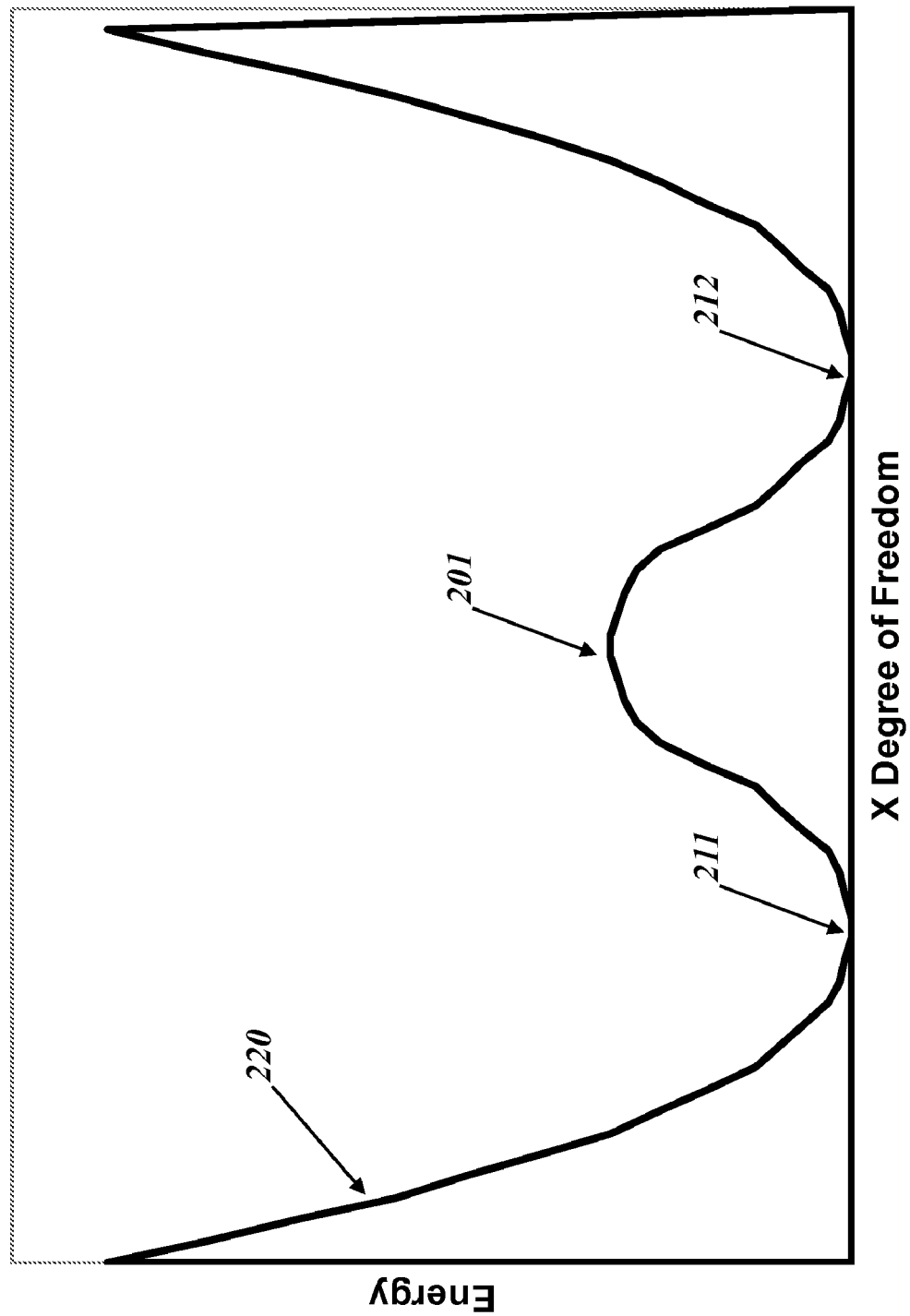
FIGURE 2

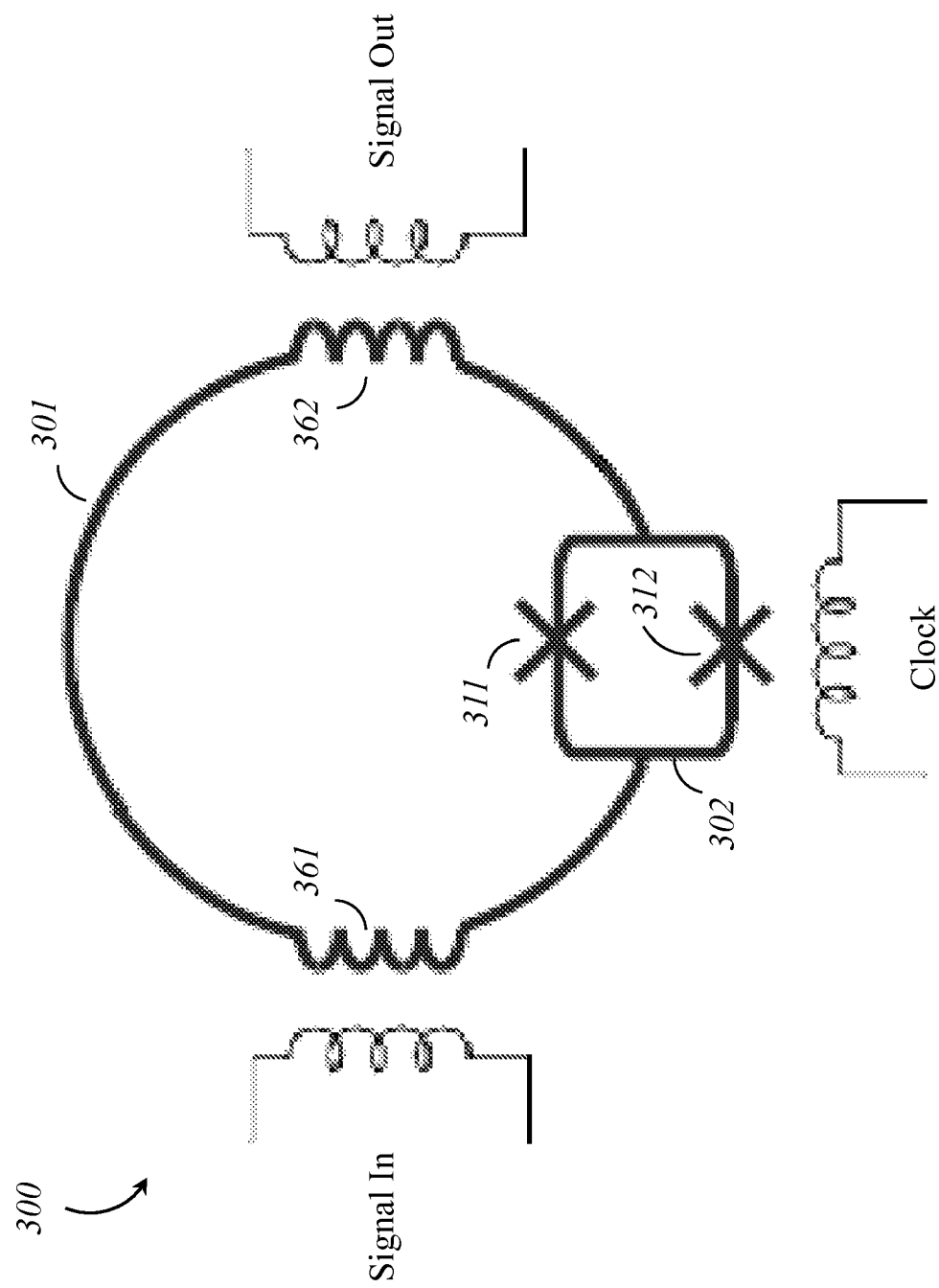
FIGURE 3

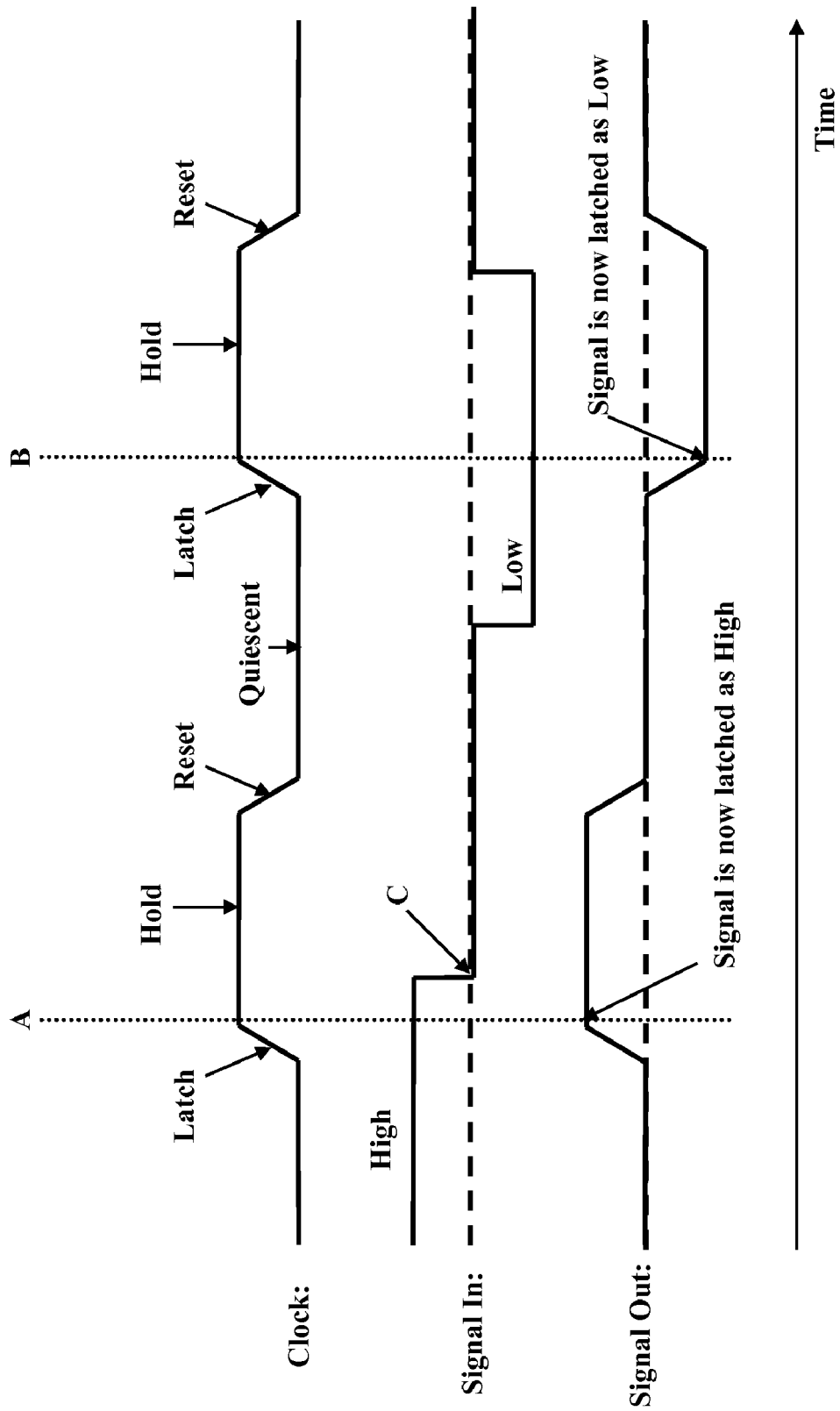
*FIGURE 4*

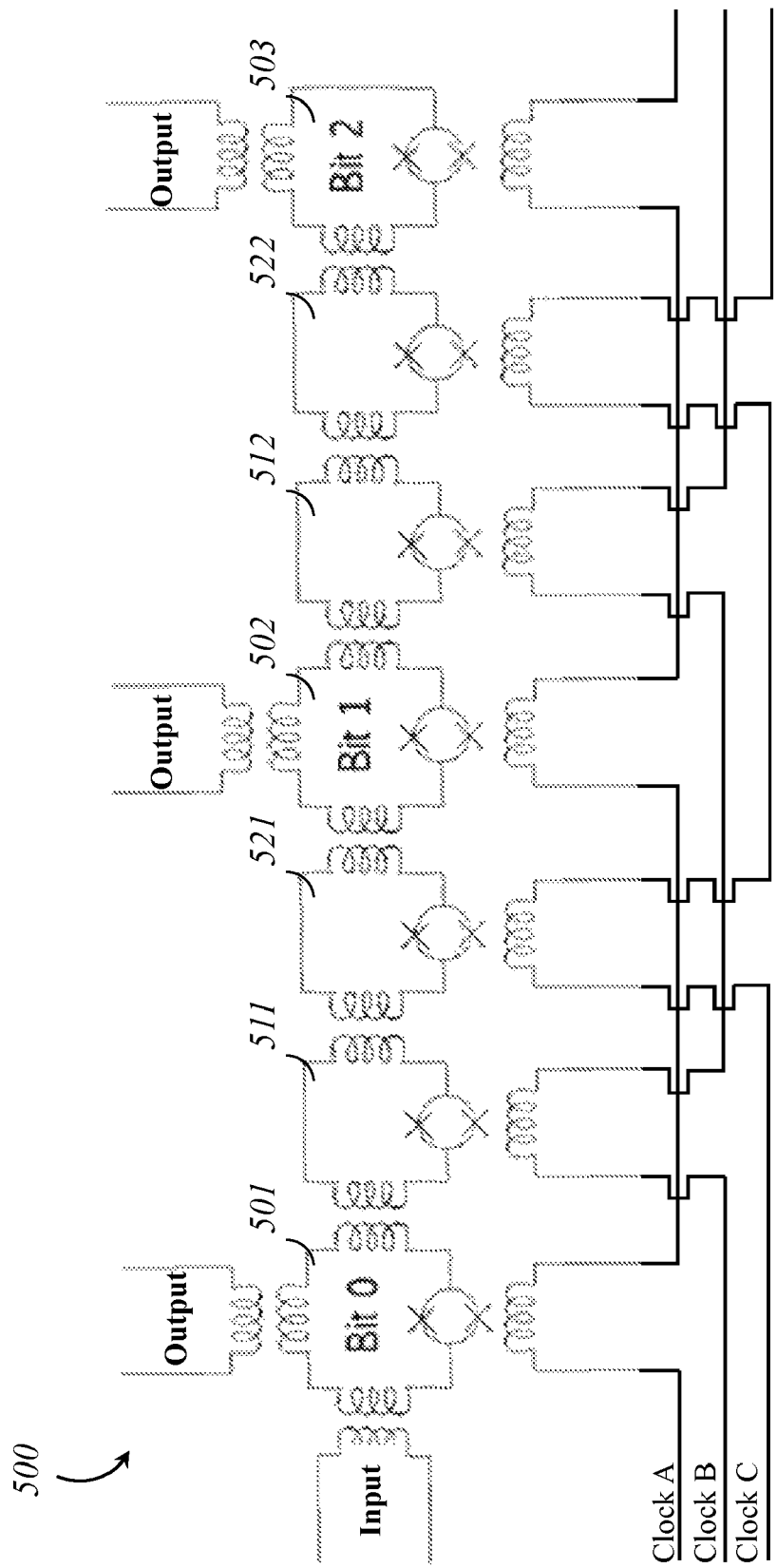
FIGURE 5

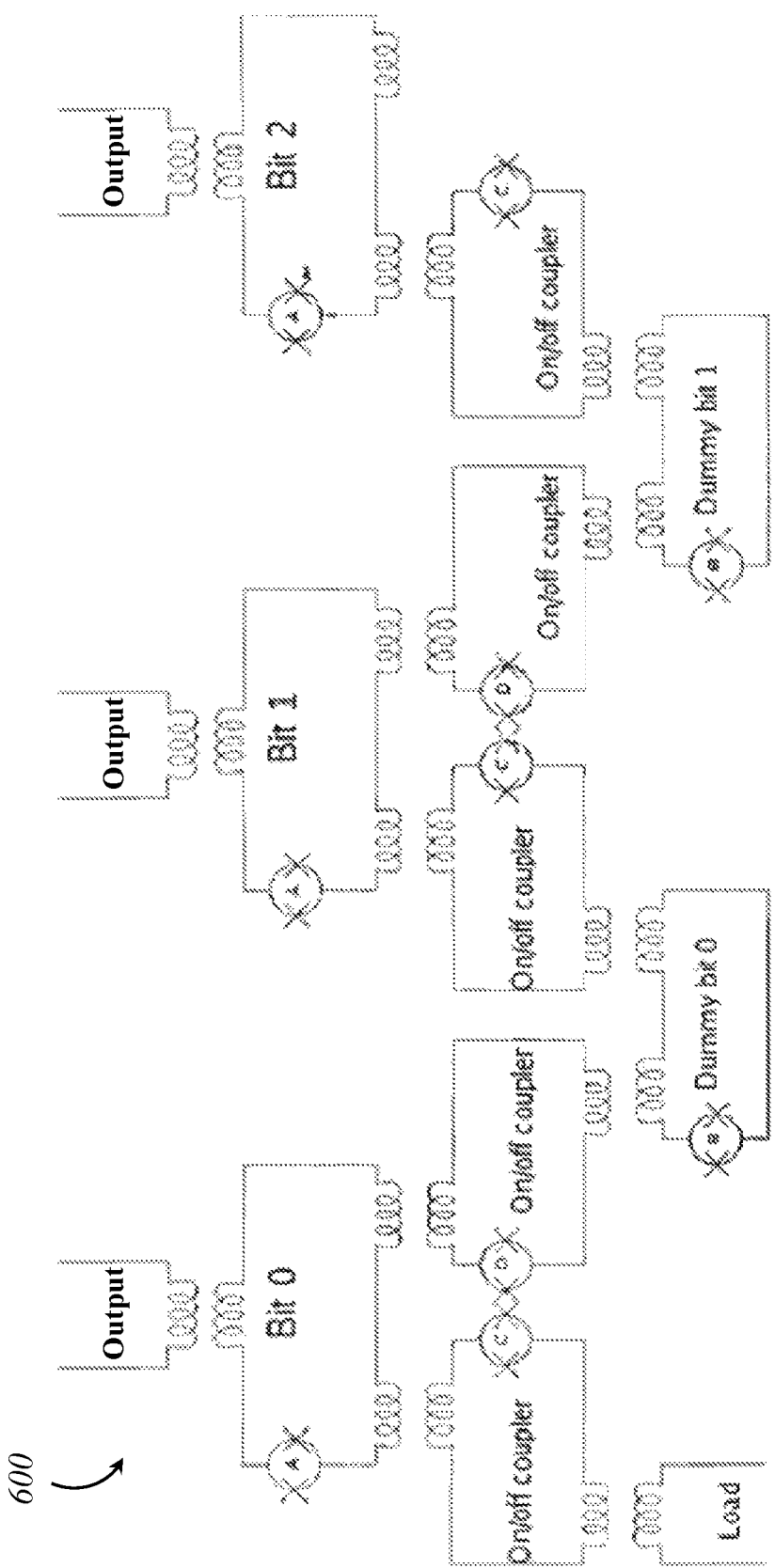
FIGURE 6

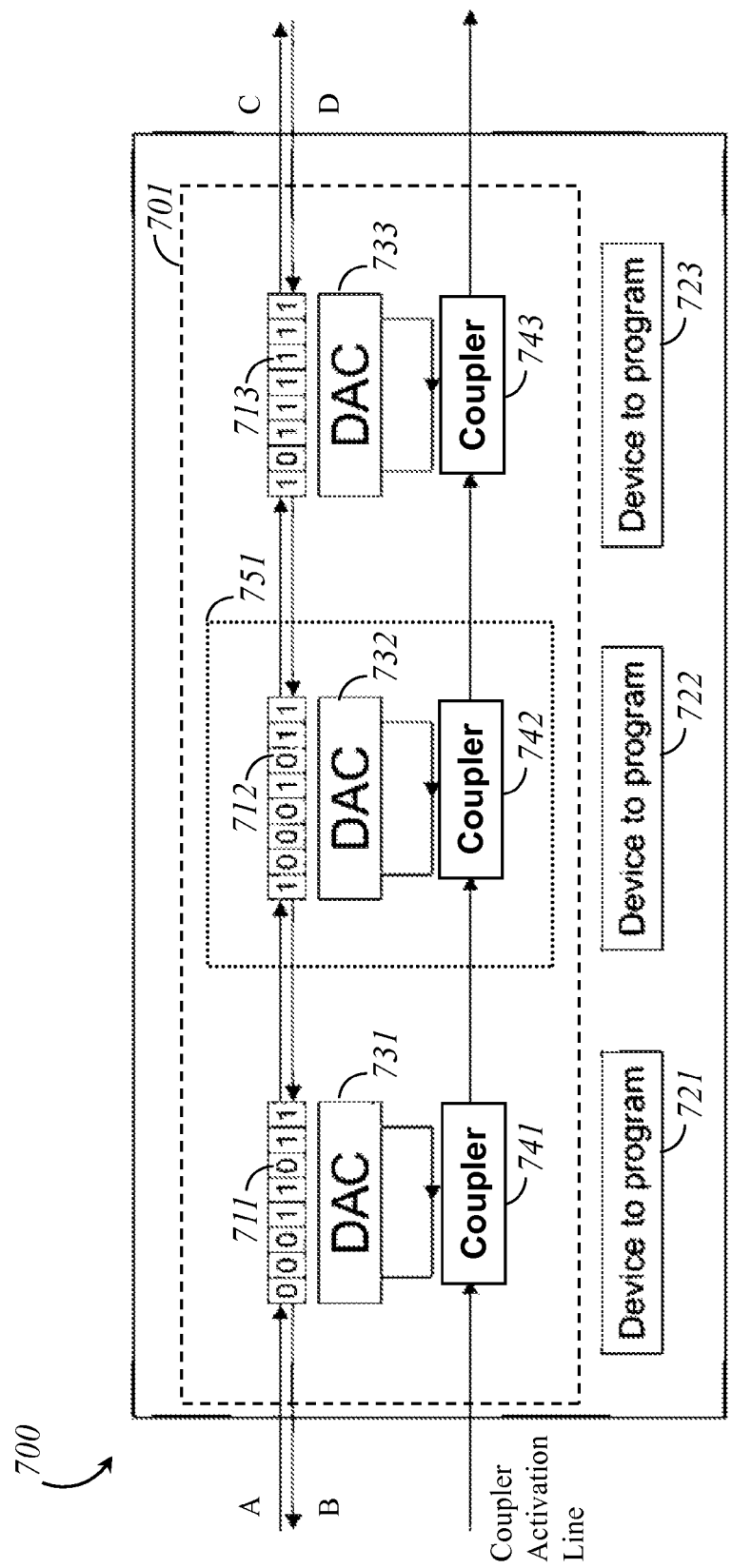
FIGURE 7

ARCHITECTURE FOR LOCAL PROGRAMMING OF QUANTUM PROCESSOR ELEMENTS USING LATCHING QUBITS

CROSS REFERENCE TO RELATED APPLICATIONS

This application is a division of U.S. patent application Ser. No. 12/109,847, filed Apr. 25, 2008, now allowed, which claims benefit under 35 U.S.C. 119(e) to U.S. Provisional Patent Application Ser. No. 60/913,980, filed Apr. 25, 2007, and entitled "Adiabatic Superconducting Qubit Logic Devices and Methods", both of which are incorporated herein by reference in their entirety.

BACKGROUND

1. Field

The present systems, methods, and apparatus relate to superconducting circuits and scalable quantum computing and the programming of elements of a quantum processor.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al., "Quantum Adiabatic Evolution Algorithms versus Simulated Annealing" arXiv.org:quant-ph/0201031 (2002), pp 1-16.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device. Examples of qubits include quantum particles, atoms, electrons, photons, ions, and the like.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the |0⟩ basis state or the |1⟩ basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar in some respects to those used for conventional integrated circuits.

Superconducting qubits are a type of superconducting device that can be included in a superconducting integrated circuit. Typical superconducting qubits, for example, have the advantage of scalability and are generally classified depending on the physical properties used to encode information including, for example, charge and phase devices, phase or flux devices, hybrid devices, and the like. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. No. 6,838,694 and U.S. Pat. No. 7,335,909.

Examples of flux qubits that may be used include rf-SQUIDs, which include a superconducting loop interrupted by one Josephson junction, or a compound junction (where a single Josephson junction is replaced by two parallel Josephson junctions), or persistent current qubits, which include a superconducting loop interrupted by three Josephson junctions, and the like. See e.g., Mooij et al., 1999, Science 285, 1036; and Orlando et al., 1999, Phys. Rev. B 60, 15398. Other examples of superconducting qubits can be found, for example, in Il'ichev et al., 2003, *Phys. Rev. Lett.* 91, 097906; Blatter et al., 2001, *Phys. Rev. B* 63, 174511, and Friedman et al., 2000, *Nature* 406, 43. In addition, hybrid charge-phase qubits may also be used.

The qubits may include a corresponding local bias device. The local bias devices may include a metal loop in proximity to a superconducting qubit that provides an external flux bias to the qubit. The local bias device may also include a plurality of Josephson junctions. Each superconducting qubit in the quantum processor may have a corresponding local bias device or there may be fewer local bias devices than qubits. In some embodiments, charge-based readout and local bias devices may be used. The readout device(s) may include a plurality of dc-SQUID magnetometers, each inductively connected to a different qubit within a topology. The readout device may provide a voltage or current. The dc-SQUID magnetometers including a loop of superconducting material interrupted by at least one Josephson junction are well known in the art.

Quantum Flux Parametron

The quantum flux parametron (QFP) is a superconducting Josephson junction device similar in structure to the compound rf-SQUID. The name "quantum flux parametron", however, encompasses both the operation and the structure of the Josephson junction device, not simply structure alone. See e.g., Hioe and Goto, *Quantum Flux Parametron—A Single Quantum Flux Superconducting Logic Device*, World Scientific Publishing Co. Pte. Ltd., Singapore (1991), pp. 23-41. A particular potential energy curve may be generated with a QFP device. This potential energy curve may resemble a "W" where the central peak or "barrier" is adjustable in height, as are the independent depths of the two wells on either side of the central barrier. In superconducting circuits, the QFP may be implemented as a magnetic flux-based logic device. It follows that QFP devices may be used to implement superconducting shift registers, superconducting memory arrays, superconducting adders, superconducting flip-flops, and other logic-based circuits.

Although the word "quantum" appears in the name of the QFP device, the device is generally operated in a classical manner. In short, quickly raising the height of the central barrier is classically believed to greatly disrupt the energy configuration of the system. Thus, damping resistors are traditionally incorporated into the QFP circuit to help dissipate energy and return the system to a stable energy configuration. These damping resistors dissipate excess energy in the form of heat, a process that can have negative effects on any system that is particularly sensitive to thermal noise. Thus, typical prior art QFP circuits are unsuitable for use with devices that are sensitive to thermal noise, such as the elements of a superconducting quantum processor.

From the quantum mechanical perspective, it is possible to adjust the height of this central barrier slowly enough that the system is not excited beyond the desired ground state. This is an example of adiabatic evolution in a quantum system. Thus, while prior-art damped QFP devices are designed for operation at high switching speeds (greater than ~20 GHz), the present systems, methods and apparatus provide undamped QFP-like devices for use in superconducting circuits where heat dissipation must be controlled. Operation of the present systems, methods and apparatus will generally be controlled adiabatically. Throughout the remainder of this specification and the appended claims, the terms "adiabatic", "adiabatically" and "adiabatic frequency" are used to describe frequencies, f, that satisfy:

$$f \leq \frac{1}{2\pi\sqrt{LC}}$$

Where L is the loop inductance and C is the capacitance of the Josephson junction. Those of skill in the art will appreciate that for most of the exemplary circuits described herein, switching speeds will be less than about 20 GHz.

Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary quantum processors that may be used in conjunction with the present systems, methods, and apparatus are described in US Patent Publication No. 2006-0225165, U.S. patent application Ser. No. 12/013,192, and U.S. Provisional Patent Application Ser. No. 60/986,554 filed Nov. 8, 2007 and entitled "Systems, Devices and Methods for Analog Processing."

A superconducting quantum processor may include a number of coupling devices operable to selectively couple respective pairs of qubits. Examples of superconducting coupling devices include rf-SQUIDs and dc-SQUIDs, which couple qubits together by flux. SQUIDs include a superconducting loop interrupted by one Josephson junction (an rf-SQUID) or two Josephson junctions (a dc-SQUID). The coupling devices may be capable of both ferromagnetic and anti-ferromagnetic coupling, depending on how the coupling device is being utilized within the interconnected topology. In the case of flux coupling, ferromagnetic coupling implies that parallel fluxes are energetically favorable and anti-ferromagnetic coupling implies that anti-parallel fluxes are energetically favorable. Alternatively, charge-based coupling devices may also be used. Other coupling devices can be found, for example, in US Patent Publication No. 2006-0147154 and U.S. patent application Ser. No. 12/017,995. Respective coupling strengths of the coupling devices may be tuned between zero and a maximum value, for example, to provide ferromagnetic or anti-ferromagnetic coupling between qubits.

Regardless of the specific hardware being implemented, managing a single qubit requires control over a number of parameters. Conventionally, this requirement necessitated outside communication (that is, communication from outside of the processor architecture) with individual qubits. However, since overall processing power increases with the number of qubits in the system, high capacity processors that exceed the abilities of conventional supercomputers must manage a large number of qubits and thus the conventional approach of employing outside control over multiple parameters on individual qubits requires a complicated system for programming qubit parameters.

Thus, the scalability of quantum processors is limited by the complexity of the qubit parameter control system and there is a need in the art for devices that enable a scalable qubit parameter control system.

BRIEF SUMMARY

At least one embodiment may be summarized as a superconducting quantum processor including a plurality of computation qubits, wherein each computation qubit comprises a qubit loop formed by a loop of superconducting material and a compound Josephson junction that interrupts the qubit loop, the compound Josephson junction comprising a closed loop of superconducting material interrupted by at least two Josephson junctions, wherein the qubit loop and the compound Josephson junction form a closed superconducting current path, and wherein each computation qubit is configured to perform at least a portion of a quantum computation; a plurality of latching qubits, wherein each latching qubit comprises a qubit loop formed by a loop of superconducting material and a compound Josephson junction that interrupts the qubit loop, the compound Josephson junction comprising a closed loop of superconducting material interrupted by at least two Josephson junctions, wherein the qubit loop and the compound Josephson junction form a closed superconducting current path, and wherein each latching qubit is inductively coupled to at least one of a computation qubit and another latching qubit; and a clock signal input structure configured to couple clock signals to the compound Josephson junction of at least one latching qubit, wherein the clock signal input structure includes at least one superconducting inductor positioned sufficiently proximate the compound Josephson junction of the at least one latching qubit to inductively couple clock signals thereto.

The clock signal input structure may be configured to couple clock signals at an adiabatic frequency. The adiabatic frequency may be below 20 GHz. The plurality of latching qubits may include a set of latching qubits arranged to form a flux-based superconducting shift register, the flux-based superconducting shift register including a set of administration latching qubits, each of the administration latching qubits coupled to receive administration clock signals and coupled to provide output flux signals to at least one programmable device of the quantum processor; a first set of dummy latching qubits, each of the dummy latching qubits of the first set of dummy latching qubits coupled to receive first dummy clock signals; a second set of dummy latching qubits, each of the dummy latching qubits of the second set of dummy latching qubits coupled to receive second dummy clock signals, wherein for each pair of successive ones of the administration latching qubits in the set of administration latching qubits, a respective one of the dummy latching qubits from the first set of latching qubits and a respective one of the dummy latching qubits from the second set of dummy latching qubits are positioned to couple flux between the administration latching qubits of the pair of successive ones of the administration latching qubits; an administration clock signal line inductively coupled to provide the administration clock signals to the administration latching qubits; a first dummy clock signal line inductively coupled to provide the first dummy clock signals to the dummy latching qubits of the first set of dummy latching qubits; and a second dummy clock signal line inductively coupled to provide the second dummy clock signals to the dummy latching qubits of the second set of dummy latching qubits. At least one programmable device may include a computation qubit from the plurality of computation qubits. A coupling between an administration latching qubit and a computation qubit may be mediated by a digital-to-analog converter. The administration clock signals, the first dummy clock signals, and the second dummy clock signals may each be operated at an adiabatic frequency. An input signal may be inductively coupled to a first one of the administrative latching qubits and propagation of signals through the flux-based superconducting shift register may be governed by the administration clock signals, the first dummy clock signals and the second dummy clock signals. The latching qubits of the set of administration latching qubits, the first set of dummy latching qubits and the second set of dummy latching qubits may be arranged in a line of sequential coupling such that each latching qubit is inductively coupled to at least one other latching qubit and any two administration latching qubits are separated by one of the dummy latching qubits from the first set of dummy latching qubits and one of the dummy latching qubits from the second set of dummy latching qubits. The flux-based superconducting shift register may further include at least a third set of dummy latching qubits, each of the dummy latching qubits of the third set of dummy latching qubits coupled to receive third dummy clock signals and positioned such that each of the dummy latching qubits of the third set of dummy latching qubits couple flux signals between respective pairs of dummy latching qubits of the first and the second sets of dummy latching qubits; and a third dummy clock signal line inductively coupled to provide the third dummy clock signals to the dummy latching qubits of the third set of dummy latching qubits such that there is at least one adiabatic clock signal corresponding to each of the first, the second and the third sets of dummy a second dummy clock signal line inductively coupled to provide the second dummy clock signals to the dummy latching qubits of the second set of dummy latching qubits. The plurality of latching qubits may include a set of latching qubits arranged to form a flux-based superconducting shift register, the flux-based superconducting shift register including a set of administration latching qubits, each of the administration latching qubits having an output structure that couples flux signals out of the flux-based superconducting shift register; a number of pairs of ON/OFF coupler latching qubits, each pair of the ON/OFF coupler latching qubits coupling flux signals with a respective one of the administration latching qubits when activated by an activation line; and a set of dummy latching qubits that couple flux signals between the pairs of the ON/OFF coupler latching qubits. A first one of the administration latching qubits may be inductively coupled to a first one of the ON/OFF coupler latching qubits of a first pair of the ON/OFF coupler latching qubits and the first one of the administration latching qubits may be inductively coupled to the second one of the ON/OFF coupler latching qubits of the first pair of the ON/OFF coupler latching qubits. A first one of the dummy latching qubits may be inductively coupled to the second one of the first pair of ON/OFF coupler latching qubits and the first one of the dummy latching qubits may be inductively coupled to a first one of the ON/OFF coupler latching qubits of a second pair of the ON/OFF coupler latching qubits. An output structure of at least one administration latching qubit may be coupled to at least one programmable element of the quantum processor. At least one programmable element may include a computation qubit from the plurality of computation qubits. The coupling between an administration latching qubit and a computation qubit may be mediated by a digital-to-analog converter. The coupling between any two of the administration latching qubits may be sequentially mediated by at least two ON/OFF coupler latching qubits, and the coupling between any two ON/OFF coupler latching qubits may be mediated by at least one dummy latching qubit. Propagation of an input signal through the flux-based superconducting shift register may be governed by the ON/OFF coupler latching qubits.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 1A is a schematic diagram of a superconducting circuit that may be implemented as a superconducting flux qubit.

FIG. 1B is a schematic diagram of an alternative superconducting circuit that may also be implemented as a superconducting flux qubit.

FIG. 2 is an approximate graph showing the general shape of the potential energy curve that may be produced by a superconducting flux qubit.

FIG. 3 is a schematic diagram of a superconducting flux qubit being operated as a latching qubit.

FIG. 4 is an approximate graph representing the operation of an embodiment of a latching qubit.

FIG. 5 is a schematic diagram of a flux-based superconducting shift register that uses latching qubits as a basic logic element.

FIG. 6 is a schematic diagram of an alternative flux-based superconducting shift register that also uses latching qubits as a basic logic element.

FIG. 7 is a functional diagram of one embodiment of the programming of quantum processor elements according to the present systems, methods and apparatus.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments. Throughout this specification and the appended claims, the words "element" and "elements" are used to encapsulate, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Furthermore, certain figures herein depict various voltage and current waveforms. These waveforms are intended to be illustrative for purposes of understanding operation of embodiments, and are not intended to be drawn to scale and/or to precisely and accurately depict waveform behavior in terms of shape, amplitude, duty cycle, frequency, distortion, or other characteristics.

In classical electrical circuits, complicated and elaborate operations may be carried out by a particular arrangement of simple switching devices, such as transistors. Examples of such arrangements include shift registers, memory arrays, adders, flip-flops, and the like. In the evolving field of superconducting electronics, and in particular superconducting quantum computing, it is essential to develop circuits that implement superconducting analogues of each of these arrangements. These arrangements may similarly be constructed using simple switching devices; however classical switching devices such as the transistor are not appropriate in the superconducting regime. Thus, in many superconducting systems it is important to establish a basic superconducting logic device with which many other circuits and operations may be realized.

An application of superconducting electronics that is of particular interest is in the field of quantum computing. Superconducting circuits are capable of exploiting quantum effects on a macroscopic scale, providing a mechanism for the implementation of quantum computation that is much more manageable than some of the alternatives. As discussed, the fundamental unit of quantum computation is the qubit. Superconducting qubits may come in a variety of forms, including the superconducting flux qubit. A superconducting flux qubit may be realized in the form of a superconducting loop that contains at least one switching device known as a Josephson junction. A quantum processor may then comprise any number of such superconducting flux qubits. Thus, in implementing such a quantum processor, techniques for fabricating large numbers of superconducting flux qubits may be developed, as well as a solid understanding of the operation of such devices. The present systems, methods and apparatus describe the use of the basic superconducting flux qubit structure as a superconducting switching device in a quantum processor. In an exemplary embodiment, an arrangement of superconducting flux qubits may be implemented as a superconducting flux-based shift register in a superconducting quantum processor. Clearly, it is advantageous to use superconducting flux qubits as logic devices in the programming of a quantum processor that already implements superconducting flux qubits, to take advantage of fabrication techniques and operating conditions already in place. The remainder of this specification deals with the use of superconducting flux qubits as basic logic devices and describes how such devices may be arranged to realize a more elaborate circuit such as a superconducting shift register.

FIG. 1A is a schematic diagram of a basic circuit 100 that may be implemented as a superconducting flux qubit. Circuit 100 comprises a first superconducting loop 101 that is interrupted by a second superconducting loop 102, which is itself interrupted by two Josephson junctions 111 and 112. Superconducting loop 101 is referred hereinafter to as the "qubit loop" while superconducting loop 102 is referred to as the "split junction loop." Those of skill in the art will appreciate that an rf-SQUID-approximation of circuit 100 may be drawn where split junction loop 102 and Josephson junctions 111 and 112 are all replaced by one Josephson junction, or similarly any number of Josephson junctions may be used in split junction loop 102.

In operation, the superconducting flux qubit of circuit 100 may communicate with other devices by inductive coupling. For example, FIG. 1B is a schematic diagram of another circuit 150 that may be implemented as a superconducting flux qubit. Note that FIG. 1B represents a one-qubit system and communication with other qubits, though possible, is not shown. In circuit 150, the qubit loop 151 contains an inductor 161 and is inductively coupled to a signal line. Similarly, the split junction loop 152 is also inductively coupled to a separate signal line. The coupling scheme in circuit 150 may be used to control the energy of the superconducting flux qubit and establish a specific potential energy curve. FIG. 2 is an approximate graph showing the general shape of the potential energy curve 220 that may be produced by circuit 150. A key feature is that the height of barrier 201 is controllable by the inductive coupling into split junction loop 152. Similarly, the relative depths of the two wells (211 and 212) on either side of the barrier 201 are controllable by the inductive coupling into qubit loop 151.

Circuit 150 shown in FIG. 1B may be used as a superconducting flux qubit, but it also resembles an embodiment of a quantum flux parametron (QFP). According to classical physics, the state of the QFP may be anywhere on or above the potential energy curve 220 of FIG. 2. As a consequence, any disruption to the system (such as a perturbation in either signal being inductively coupled into circuit 150) may cause a change in the energy state of the system. Furthermore, once the system has been excited into a new energy state there is no mechanism of classical physics that causes the system to stabilize. The QFP is typically operated in a classical manner, and for this reason the QFP circuit traditionally includes damping resistors that shunt each Josephson junction. The function of these damping resistors is to dissipate the excess energy in the QFP when perturbed, thus allowing the QFP to settle into a new state. Unfortunately, the damping resistors dissipate this energy in the form of heat and become a source of undesirable thermal noise in highly sensitive superconducting circuits. A superconducting quantum processor, for instance, cannot operate reliably in the presence of such ambient thermal noise.

In accordance with the present systems, methods and apparatus, damping resistors are not required in a QFP-like circuit, such as circuit 150, as long as the system is evolved adiabatically. In other words, provided that any controlled perturbations to the system Hamiltonian (via, for example, inductively coupled signal lines) are conducted slowly enough, the system will stabilize in its new energy-state without absorbing and needing to dissipate "excess" energy. This is because the classical belief that the energy is continuous (i.e., that the state of the QFP may be found anywhere in the grey region of FIG. 2) is proven to be incorrect in quantum mechanics. In actuality, the energy may only be observed at discrete levels above the potential energy curve 220 of FIG. 2 and it requires a specific and definite amount of energy to cause the system to transition into a new energy state. Quantum mechanically, if the system is evolved slowly enough, there can be no "leftover" energy requiring dissipation and the system will transition from one stable state to the next. Note that typical QFP devices that include shunt resistors are operated at speeds around 20 GHz which may be beyond the threshold of adiabatic evolution. However, so long as the QFP-like devices of the present systems, methods and apparatus are operated according to an adiabatic frequency (those of skill in the art will appreciate that for most systems, this will be below about 20 GHz), the need for shunt resistors is eliminated and the problem of thermal noise dissipation in the circuit is avoided. Furthermore, in an adiabatic quantum processor such devices may be used in the initialization of the system, but not necessarily in the computation process. Thus, reducing the operational speed may be of small consequence to the total computation time and more than justified by the savings in energy dissipation.

In accordance with the present systems, methods and apparatus, the structure that comprises a superconducting flux qubit may be implemented for the purposes of computation (as is typically seen in the art) or for the purposes of logical programming. As an element of computation, a superconducting flux qubit may be operated as a "computation qubit." As a logic device, a superconducting flux qubit may be operated as a "latching qubit." The concept of latching in classical electrical circuits is well known in the art and is therefore described only briefly herein. Classical latching is understood in the art. Throughout this specification and the appended claims, to "latch" a superconducting signal refers to the process of loading an instantaneous signal, retaining the instantaneous signal despite perturbations or evolutions in the source signal, and continuously outputting the instantaneous signal until the latching is quenched. Thus, the term "latching qubit" is used herein to denote a device that implements this process, while the term "computation qubit" is used herein to denote a qubit used to perform quantum computation.

FIG. 3 is a schematic diagram of a superconducting flux qubit being operated a latching qubit 300. Similar to FIGS. 1A and 1B, the circuit of latching qubit 300 comprises a qubit loop 301 and a split junction loop 302, where split junction loop 302 contains two Josephson junctions 311 and 312. Latching qubit 300 further comprises two superconducting inductors 361 and 362 for the purposes of inductively coupling input and output signals, respectively. In this embodiment, split junction loop 302 is itself inductively coupled to a clock signal line. This clock signal controls the operation of latching qubit 300. Throughout this specification and the appended claims, the terms "clock" and "clock signal" are frequently used to refer to a controllable signal of periodic pulses. Those of skill in the art, however, will appreciate that a controllable signal of pulses may be embodied by other signals or devices in an electric circuit or other medium (e.g., light) and the pulses need not be periodic. Thus, the terms "clock" and "clock signal" are used herein in their broadest sense and are meant to encompass all manner of administering a controllable signal of pulses.

The schematic diagram of latching qubit 300 that is shown in FIG. 3 is intended to be illustrative and serves as an example of an embodiment. Those of skill in the art will appreciate that many alterations may be made to the circuit to accommodate specific system requirements. For example, qubit loop 301 may be of an alternate shape, such as square or rectangular; coupling to the signal lines may occur through an alternative means, such as via galvanic coupling; there may be more or fewer than two coupling locations on qubit loop 301; there may be more or fewer than two Josephson junctions in split junction loop 302; and Josephson junctions may also be inserted in qubit loop 301. All such alterations are specific to the exact system in which the latching qubit is being implemented, while the general principles behind operating a superconducting flux qubit as a latching qubit according to the present systems, methods and apparatus remain substantially unchanged.

FIG. 4 shows an approximate graph representing a sample operation of latching qubit 300. Three simultaneous signals are shown in FIG. 4: the clock signal, the input signal, and the output signal. In this embodiment, whenever the clock signal steps up, the latching qubit loads the input signal at that instant, holds that instantaneous signal, and transmits it to the output (for example, to a computation qubit) for the duration of the clock pulse. For example, at point A in FIG. 4 the clock pulse steps up while the signal input is high. Thus, a high signal is "latched" by the latching qubit and held for the duration of the clock pulse. While the high signal is held, it appears at the signal output of the latching qubit. An important aspect is that the latching qubit holds onto the signal that it initially received the moment the clock pulse stepped upwards. Even if the input signal continues to evolve, the latching qubit effectively takes a picture of the input signal the moment the clock pulse steps upwards and that is the signal that is latched and transferred to the output. Notice that in FIG. 4 the input signal steps down at point C while the first clock pulse is still high, but the output signal remains high because that is the signal that is being held by the latching qubit. The output signal terminates as the clock pulse steps down and no signal is transmitted while the clock remains quiescent. At point B, the clock pulse again steps up, this time while the input signal is low. Thus, a low signal is latched and continuously output by the latching qubit until the clock pulse steps back down again.

The approximate graphs shown in FIG. 4 represent an illustrative embodiment of the operation of a latching qubit according to the present systems, methods and apparatus. In other embodiments, latching in the latching qubit may be triggered by a downwards step in the clock pulse. While the timing of the latching is governed by the adiabatic clock frequency, the exact manner in which latching is triggered depends on the range of magnitudes covered by the clock pulses. The clock pulse may be used to alter the shape of the potential energy curve of the system. The input signal applied to a latching qubit is "quenched" when the potential energy curve of the system resembles a parabolic or "U" shape. The input signal applied to a latching qubit is "latched" when the potential energy curve of the system resembles the "W" shape as shown in FIG. 2. The clock pulse may be used to raise a barrier (such as barrier 201 In FIG. 2) in the potential energy curve of the system, thereby producing the "W" shaped potential energy curve and triggering the latching.

Depending on the specific requirements of the system in which latching qubits are being implemented, the clock signal may be administered in a variety of different ways. One way to administer the clock signal is to apply one signal that threads the split junction loop as shown in FIG. 3. In such a case, the clock signal may be applied with a background bias and then pulsed above or below the bias. The bias may be applied with a magnitude of $(n+\frac{1}{2})\phi_o$ where n is any integer including 0. This bias produces the parabolic potential energy curve with no barrier and thus corresponds to a quenched state. In this embodiment, a barrier such as barrier 201 may be established in the potential energy curve by pulsing the clock signal to the nearest odd multiple of $\phi_o$. Thus, for even values of n (including 0), the clock signal may be pulsed upwards to $(n+1)\phi_o$. Conversely, for odd values of n in this embodiment, the clock signal may be pulsed downwards to $n\phi_o$. An embodiment that satisfies these criteria is a clock signal with a background bias of $\phi_o/2$ and that is pulsed upwards from $\phi_o/2$ to $\phi_o$. The input signal will be quenched while the clock signal is $\phi_o/2$ and the input signal will be latched as the clock pulse steps up to $\phi_o$.

An alternative way to load the clock signal is to apply two signals: a first clock signal threading the qubit loop with a background bias and a second clock signal threading the split junction loop with controlled clock pulses. In such a case, the background bias threading the qubit loop may be applied with a magnitude of $(n+\frac{1}{2})\phi_o$ where n is any integer including 0. This bias produces the "W" potential energy curve with the central barrier that triggers latching in the system. In this embodiment, the barrier may be removed to produce the quenched state by accordingly pulsing the clock signal threading the split junction loop. Thus, the latching state may be triggered when the clock signal threading the split junction loop is pulsed to the nearest even multiple of $\phi_o$, including zero. As in the clocking scheme where no clock signal threads the qubit loop, the clock signal threading the split junction loop may have a background bias. This bias may be applied with a magnitude of $(m+\frac{1}{2})\phi_o$ where m is any integer including 0. Thus, whether latching is triggered by an upwards step or a downwards step in the clock pulse threading the split junction loop depends on the value of m, or whether or not a background bias is present at all in the clock signal threading the split junction loop. For odd values of m, latching may be triggered as the clock pulse threading the split junction loop steps upwards to $(m+1)\phi_o$. Conversely, for even values of m in this embodiment, latching may be triggered as the clock pulse threading the split junction loop steps downwards to $m\phi_o$. An embodiment that satisfies these criteria is a clock signal threading the qubit loop with a background bias of $\phi_o/2$ in conjunction with a clock signal threading the split junction loop which pulses downwards from $\phi_o/2$ to 0 with no background bias. The input signal will be quenched while the clock signal threading the split junction loop is $\phi_o/2$ and the input signal will be latched as the clock signal threading the split junction loop steps down to 0. However, those of skill in the art will appreciate that this latter clocking scheme necessitates an additional superconducting inductor beyond the two shown in FIG. 3 (361 and 362) and an additional signal line to provide the constant background flux to the qubit loop.

The latching occurs because the ground state of the latching qubit is aligned with the external field, and the adiabatic barrier raising keeps the system in the ground state. Thus, controlled adiabatic evolution is essential in the operation of the latching qubits described in the present systems, methods and apparatus. This means that in many systems, the clock signal should operate at a frequency below about 20 GHz. Operating in this frequency range is of benefit in that it allows the state of the system to stabilize without incorporating shunt resistors on the Josephson junctions. The latching qubit produces far less heat than single flux quantum (SFQ) devices and is therefore a useful logic device for systems that operate at millikelvin temperatures and are highly sensitive to thermal noise.

The latching qubit holds the instantaneous input signal loaded at the moment the clock signal pulses and establishes the barrier in the potential energy curve. In practice, however, the latched signal may be slightly affected by fluctuations in the input signal that occur while the barrier remains (that is, for the duration of the clock pulse). These effects occur due to crosstalk within the device and with other nearby devices. The effects of crosstalk must be taken into account when operating superconducting flux qubits as latching qubits.

FIG. 5 is a schematic diagram of flux-based superconducting shift register 500 that uses latching qubits as its basic logic element. The structure of flux-based superconducting shift register 500 comprises a plurality of latching qubits arranged in a line such that each latching qubit is inductively coupled to at least one neighboring latching qubit. Throughout this specification and the appended claims, a plurality of latching qubits is frequently referred to as being arranged in a "line." The term "line" is used in this context to describe a continuous chain of latching qubits, where each latching qubit is coupled to two other latching qubits, except at the beginning and end of the line. Latching qubits that are situated at the beginning and end of a line are each only coupled to one other latching qubit. Though flux-based superconducting shift register 500 is drawn in FIG. 5 as a straight horizontal line, the term "line" is used in this specification to describe the chain-like coupling scheme rather than the geometric layout of the devices. Those of skill in the art will appreciate that, as with all electric circuits, the geometric layout of the devices may take any form to accommodate the requirements of the specific system in which the device or devices are being implemented. An example of such versatility is depicted in FIG. 6, in which a similar chain-like coupling scheme is implemented defining a line of inductively coupled latching qubits, though in this case the physical layout of the circuit is not a straight horizontal line. Those of skill in the art will appreciate that two dimensional layouts of coupled latching qubits, such as a box or a serpentine "S" pattern, may similarly be implemented.

Although flux-based superconducting shift register 500 is a 3-bit shift register, those of skill in the art will appreciate that a similar shift register of any resolution may be constructed by accordingly scaling the devices shown in FIG. 5. The shown embodiment uses latching qubits 501, 502, and 503 to each administer one bit of information to at least one programmable device in the form of discrete magnetic flux quanta, while latching qubits 511, 512, 521, and 522 are used as "dummy latching qubits" for signal isolation and communication within flux-based superconducting shift register 500 itself. Because latching qubits 501, 502, and 503 are ultimately used to embody and administer the complete programmed digital signal, they are referred to herein as the "administration latching qubits". Those of skill in the art will appreciate that the terms "administer", "administering", "administration" and the like are used herein to encapsulate, but are not limited to, all manner of generating, managing, storing, operating upon and transferring the data signals. Thus, the term "administration latching qubit" is used herein to denote a latching qubit that is coupled to a programmable device and thereby administers a data signal to the programmable device. In some embodiments, an administration latching qubit may be coupled directly to at least one computation qubit or at least one qubit coupler. In some embodiments, the coupling between an administration latching qubit and a computation qubit or qubit coupler may be mediated by a superconducting digital-to-analog converter (DAC). Examples of superconducting DACs are described in U.S. Provisional Patent Application Ser. No. 60/917,884, filed May 14, 2007, entitled "Scalable Superconducting Flux Digital-To-Analog Conversion Using A Superconducting Inductor Ladder Circuit"; U.S. Provisional Patent Application Ser. No. 60/917,891, filed May 14, 2007, entitled "Systems, Methods, And Apparatus For A Scalable Superconducting Flux Digital-To-Analog Converter"; and U.S. Provisional Patent Application Ser. No. 60/975,487, filed Sep. 26, 2007, and entitled "Systems, Methods and Apparatus for a Differential Superconducting Flux Digital-to-Analog Converter."

Each latching qubit in flux-based superconducting shift register 500 operates in a manner similar to latching qubit 300 of FIG. 3. That is, each latching qubit in flux-based superconducting shift register 500 is coupled to an input signal line, an output signal line, and a clock signal line. In this embodiment, flux-based superconducting shift register 500 requires three distinct clock signal lines, shown as Clock A, Clock B, and Clock C in FIG. 5. The input signal is loaded and latched by each device at the instant the corresponding clock signal pulses to establish a barrier in the potential energy curve, and the latched signal is retained for the duration of the clock pulse. In flux-based superconducting shift register 500, the input signal is propagated from left to right through the individual latching qubits in the following order: 501, 511, 521, 502, 512, 522, 503.

While flux-based superconducting shift register 500 is a 3-bit shift register, it is implemented by seven latching qubits: latching qubits 501, 502, and 503 as administration latching qubits and latching qubits 511, 512, 521, and 522 as dummy latching qubits for communication within flux-based superconducting shift register 500 itself. In this embodiment, these dummy latching qubits may be used to isolate the administration latching qubit signals from one another. Latching qubits 501, 502, and 503 are the administration latching qubits and are used to administer the programmed 3-bit signal to at least one programmable device. However, all variations of a 3-bit signal cannot be loaded into latching qubits 501, 502, and 503 on their own because of the nature of operation of these devices. A latching qubit, such as any of those shown in FIG. 5, holds a signal until it is specifically quenched by the corresponding clock-pulse. Furthermore, unlike standard logic gates, signal transfer between adjacent latching qubits is not biased in a preferred direction. A signal latched in a given latching qubit will travel backwards just as well as forwards (that is, right to left just as well as left to right in FIG. 5) depending on the clock-pulse synchronization. Implementing a system where at least two dummy latching qubits separate each pair of successive administration latching qubits allows the administration latching qubits to be sufficiently isolated so that a deliberate sequence of clock pulses permits only forward propagation of the input signal. This embodiment ensures that at least one layer of quenched latching qubits may separate adjacent administration latching qubits and thus stop reverse-coupling of logic signals. Three clock signal lines are used because latching qubits are two-terminal devices. Thus, neighboring latching qubits in flux-based superconducting shift register 500 are activated at different phases and logic signals are propagated from one active device to the next adjacent activated device. If the sequence of latching qubits in FIG. 5 (that is: 501, 511, 521, 502, 512, 522, 503) is read as Admin0, 1Dum0, 2Dum0, Admin1, 1Dum1, 2Dum1, and Admin2, then the clock signals are coupled into flux-based superconducting shift register 500 such that AdminO, Admin1, and Admin2 are all coupled to a first clock line (Clock A); 1Dum0 and 1Dum1 are both coupled to a second clock line (Clock B); and 2Dum0 and 2Dum1 are both coupled to a third clock line (Clock C). Thus, latching qubits that are in the same relative position in the line of inductively coupled latching qubits are all coupled to the same clock signal line. For example, all administration latching qubits are coupled to one clock signal line, all dummy latching qubits that couple to an administration latching qubit on their left are coupled to a second clock signal line, and all dummy latching qubits that couple to an administration latching qubit on their right are coupled to a third clock signal line. As previously stated, according to the present systems, methods and apparatus shunt resistors across each Josephson junction are not required so long as each clock signal is operated at an adiabatic frequency. Furthermore, while all coupling shown in FIG. 5 is inductive coupling, those of skill in the art will appreciate that alternative means of coupling, such as galvanic coupling, may be used instead as appropriate in the specific application.

The input signal is only administered to a given latching qubit if it coincides with a clock pulse into that device. For example, if a high input signal is coupled into latching qubit 501, the signal will be latched by latching qubit 501 only when Clock A pulses to establish a barrier in the potential energy curve. Now, if Clock B pulses during the pulse of Clock A (that is, before Clock A returns to the quenched state), then latching qubit 511 will latch the signal from latching qubit 501. Similarly, if Clock C then pulses during the pulse of Clock B (that is, before Clock B returns to the quenched state), then latching qubit 521 will latch the signal from latching qubit 511. Note that even in this small example which describes only three latching qubits (501, 511, and 521), the operation of three distinct clock signals (each of which may operate at any adiabatic frequency) enables any signal combination to be distributed across the latching qubits in flux-based superconducting shift register 500. That is, at any given instant the signal embodied in latching qubits 501, 511, and 521 may be programmed as 000, 001, 010, 100, 011, 101, 110, or 111.

The embodiment of a flux-based superconducting shift register shown in FIG. 5 is illustrative and serves only as an example of one way in which latching qubits may be implemented as a superconducting shift register. In this embodiment, three clock signal lines are implemented to use full signal resolution in programming a system that uses two dummy latching qubits in between each pair of adjacent administration latching qubits. Those of skill in the art will appreciate that any system implementing a greater number of dummy latching qubits and/or a greater number of clock signal lines may be advantageous in specific systems. Furthermore, the present systems, methods and apparatus include embodiments in which fewer clock lines and/or dummy latching qubits are implemented. For instance, an alternative embodiment of a flux-based superconducting shift register is depicted in FIG. 6.

FIG. 6 is a schematic diagram of flux-based superconducting shift register 600 that uses latching qubits as its basic logic element. Flux-based superconducting shift register 600 is another 3-bit shift register, though those of skill in the art will again appreciate that a similar shift register of any signal resolution may be constructed by accordingly scaling the devices of FIG. 6. In flux-based superconducting shift register 600, the role of clock signals is replaced by ON/OFF couplers which are controlled by signal lines (not shown). These couplers activate latching in the latching qubits of flux-based superconducting shift register 600 in much the same way as clock pulses do in the latching qubits of flux-based superconducting shift register 500. In this embodiment, at least one dummy latching qubit is used in between adjacent relevant latching qubits. The dummy latching qubit serves as an intermediate device in which the signal may be stored when a relevant latching qubit is erased. In all other respects, flux-based superconducting shift register 600 functions in a very similar way to flux-based superconducting shift register 500, except that the role of the clock-pulses is carried out by the ON/OFF couplers. In this embodiment, an active (ON) coupler is analogous to a clock pulse in the direction that triggers the latched state, while an inactive (OFF) coupler is analogous to a clock pulse in the direction that triggers the quenched state.

In both FIG. 5 and FIG. 6, the three outputs of the flux-based superconducting shift registers are shown each inductively coupled from a different administration latching qubit. In some embodiments of these devices, each output may couple to at least one distinct programmable device. In other embodiments, a single programmable device may be coupled to more than one output of a flux-based superconducting shift register. Those of skill in the art will appreciate that alterations such as these are specific to the particular system in which the latching qubit is being used.

The present systems, methods and apparatus introduce the use of superconducting flux qubits as basic logic devices in programming the elements of a superconducting processor, such as a superconducting quantum processor. Further description of the on-chip programming of quantum processor devices is provided in U.S. patent application Ser. No. 11/950,276.

FIG. 7 shows an exemplary quantum processor 700 which includes memory administration system 701 and three programmable devices 721, 722, 723. Note that memory administration system 701 may be scaled to include any number of programmable devices by simply scaling the devices shown in FIG. 7 accordingly. Furthermore, although FIG. 7 shows quantum processor 700 as one physical structure, the components of quantum processor 700 may be divided into a plurality of separate physical units that are connected by a system of communication conduits. Reference throughout this specification to a "communication conduit" or a plurality of "communication conduits" encompasses all means of signal transfer, including but not limited to electrical wires, magnetic (inductive) coupling, fiber-optics, and the like.

In FIG. 7, memory administration system 701 comprises a string of memory registers 711, 712, 713 which are used to administer signals representative of data, such as N-bit digital signals, to each programmable device 721, 722, 723 in quantum processor 700. As previously described, those of skill in the art will appreciate that the terms "administer", "administering", "administration" and the like are used herein to encapsulate, but are not limited to, all manner of generating, managing, storing, operating upon and transferring the data signals. The N-bit signals may be programmed to represent various parameters that influence the behavior of programmable devices 721, 722, 723. For illustration, 8-bit signals and serially connected 8-bit memory registers 711, 712, 713 are shown in FIG. 7, but those of skill in the art will appreciate that signals of any bit length or resolution may be employed and that memory registers 711, 712, 713 may be connected in another manner or may not be connected at all, i.e., they may each be independently controlled and each have their own individual communication lines A, B, C, D.

As shown in FIG. 7, the data signals administered by memory registers 711, 712, 713 are digital signals, however those of skill in the art will appreciate that data signals of other forms may be employed. Before being coupled to programmable devices 721, 722, 723, the digital signals are converted into analog signals by digital to analog converters (DACs) 731, 732, 733. Here, the digital bits of each signal are used to produce calibrated analog signals which can be coupled to programmable devices 721, 722, 723. In some embodiments, as shown in FIG. 7, this coupling is accomplished via intermediate coupling devices 741, 742, 743. The intermediate coupling devices 741, 742, 743 may be connected in series to a coupler activation line and be activated (or deactivated) by the coupler activation line. Thus, in such embodiments, the signal is only administered from DACs 731, 732, 733 to programmable devices 721, 722, 723 when intermediate coupling devices 741, 742, 743 are activated by the coupler activation line.

By employing the present systems, methods and apparatus, a portion of the control communication may be contained within quantum processor 700 while external input includes the programming of the N-bit signals via communication lines A-D, and the activation/deactivation of intermediate coupling devices 741, 742, 743 via the coupler activation line. As such, the number of communication lines required to connect quantum processor 700 to an external system is greatly reduced and becomes essentially independent of the number of programmable devices in quantum processor 700.

In some embodiments, quantum processor 700 may comprise a plurality of computation qubits coupled by a plurality of programmable couplers such as those described in Harris, R. et al., "Sign and Magnitude Tunable Coupler for Superconducting Flux Qubits", arXiv.org:cond-mat/0608253 (2006), pp 1-5. Since such qubits and their associated couplers are designed to manage flux signals, the N-bit signals from memory registers 711, 712, 713 may be administered in the form of magnetic flux quanta in such an embodiment. Memory registers 711, 712, 713 may then be flux-based superconducting shift registers comprised of latching qubits. The flux-based superconducting shift registers may be serially linked so that the number of communication lines to the external programming system does not depend on the number of registers used. The N-bit signal loaded into each register may be represented digitally by discrete magnetic flux quanta within the flux-based superconducting shift registers. The flux-based superconducting shift registers may be inductively or galvanically coupled to DACs 731, 732, 733 which combine the digital magnetic flux quanta to produce a calibrated analog supercurrent. In some embodiments, the calibrated analog supercurrent may then be inductively coupled to programmable devices 721, 722, 723 via intermediate coupling devices 741, 742, 743 by activating the coupler activation line. In other embodiments, the calibrated analog supercurrent may be inductively coupled directly to programmable devices 721, 722, 723.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, methods and apparatus of quantum computation, not necessarily the exemplary systems, methods and apparatus for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 60/913,980, filed Apr. 25, 2007, and entitled "Adiabatic Superconducting Qubit Logic Devices and Methods", U.S. Pat. Nos. 6,838, 694, 7,335,909, US Patent Publication No. 2006-0225165, U.S. patent application Ser. No. 12/013,192, U.S. Provisional Patent Application Ser. No. 60/986,554 filed Nov. 8, 2007 and entitled "Systems, Devices and Methods for Analog Processing", US Patent Publication No. 2006-0147154, U.S. patent application Ser. No. 12/017,995, U.S. Provisional Patent Application Ser. No. 60/917,884, filed May 14, 2007, entitled "Scalable Superconducting Flux Digital-To-Analog Conversion Using A Superconducting Inductor Ladder Circuit"; U.S. Provisional Patent Application Ser. No. 60/917,891, filed May 14, 2007, entitled "Systems, Methods, And Apparatus For A Scalable Superconducting Flux Digital-To-Analog Converter"; and U.S. Provisional Patent Application Ser. No. 60/975,487, filed Sep. 26, 2007, and entitled "Systems, Methods and Apparatus for a Differential Superconducting Flux Digital-to-Analog Converter"; and U.S. patent application Ser. No. 11/950,276, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:
1. A superconducting quantum processor comprising:
a plurality of computation qubits, wherein each computation qubit comprises at least one loop of superconducting material and at least one Josephson junction, and wherein each computation qubit is configured to perform at least a portion of a computation;

a plurality of latching qubits, wherein each latching qubit comprises a first loop of superconducting material and a compound Josephson junction that interrupts the first loop of superconducting material, the compound Josephson junction comprising a closed loop of superconducting material interrupted by at least two Josephson junctions, wherein the first loop of superconducting material and the compound Josephson junction form a closed superconducting current path, and wherein each latching qubit is configured to galvanically couple to at least one of a computation qubit and another latching qubit; and a clock signal input structure configured to couple clock signals to the compound Josephson junction of at least one latching qubit.

2. The superconducting quantum processor of claim 1 wherein the clock signal input structure is configured to couple clock signals at a frequency that is at least one of an adiabatic frequency or a frequency below 20 GHz.

3. The superconducting quantum processor of claim 1 wherein the plurality of latching qubits includes a set of latching qubits arranged to form a superconducting shift register, the superconducting shift register comprising:

a set of administration latching qubits, each of the administration latching qubits configured to receive administration clock signals and configured to couple with a respective element of the quantum processor;

a first set of dummy latching qubits, each of the dummy latching qubits of the first set of dummy latching qubits configured to receive first dummy clock signals;

a second set of dummy latching qubits, each of the dummy latching qubits of the second set of dummy latching qubits configured to receive second dummy clock signals, wherein for each pair of successive ones of the administration latching qubits in the set of administration latching qubits, a respective one of the dummy latching qubits from the first set of latching qubits and a respective one of the dummy latching qubits from the second set of dummy latching qubits are positioned to serially mediate coupling between the administration latching qubits of the pair of successive ones of the administration latching qubits;

an administration clock signal line configured to couple the administration clock signals to the administration latching qubits;

a first dummy clock signal line configured to couple the first dummy clock signals to the dummy latching qubits of the first set of dummy latching qubits; and a second dummy clock signal line configured to couple the second dummy clock signals to the dummy latching qubits of the second set of dummy latching qubits.

4. The superconducting quantum processor of claim 3 wherein at least one element of the quantum processor includes a computation qubit from the plurality of computation qubits.

5. The superconducting quantum processor of claim 4, further comprising:

a digital-to-analog converter coupled to mediate a coupling between one of the administration latching qubits and one of the computation qubits.

6. The superconducting quantum processor of claim 3 wherein the administration clock signals, the first dummy clock signals, and the second dummy clock signals are each operated at an adiabatic frequency.

7. The superconducting quantum processor of claim 3 wherein an input signal line is configured to couple input signals to a first one of the administrative latching qubits and propagation of signals through the superconducting shift register is governed by the administration clock signals, the first dummy clock signals and the second dummy clock signals.

8. The superconducting quantum processor of claim 3 wherein the latching qubits of the set of administration latching qubits, the first set of dummy latching qubits and the second set of dummy latching qubits are arranged in a line of sequential coupling such that each latching qubit is configured to couple to at least one other latching qubit and any two administration latching qubits are separated by one of the dummy latching qubits from the first set of dummy latching qubits and one of the dummy latching qubits from the second set of dummy latching qubits.

9. The superconducting quantum processor of claim 3 wherein the superconducting shift register further comprises:

at least a third set of dummy latching qubits, each of the dummy latching qubits of the third set of dummy latching qubits configured to receive third dummy clock signals and positioned such that each of the dummy latching qubits of the third set of dummy latching qubits mediates a coupling between respective pairs of dummy latching qubits of the first and the second sets of dummy latching qubits; and a third dummy clock signal line configured to couple the third dummy clock signals to the dummy latching qubits of the third set of dummy latching qubits such that there is at least one adiabatic clock signal corresponding to each of the first, the second and the third sets of dummy latching qubits.

10. The superconducting quantum processor of claim 1 wherein the plurality of latching qubits includes a set of latching qubits arranged to form a superconducting shift register, the superconducting shift register comprising:

a set of administration latching qubits, each of the administration latching qubits having an output structure configured to couple signals out of the superconducting shift register;

a number of pairs of ON/OFF coupler latching qubits, each pair of the ON/OFF coupler latching qubits configured to couple signals with a respective one of the administration latching qubits when activated by an activation line; and a set of dummy latching qubits that couple flux signals between the pairs of the ON/OFF coupler latching qubits.

11. The superconducting quantum processor of claim 10 wherein a first one of the administration latching qubits is configured to couple to a first one of the ON/OFF coupler latching qubits of a first pair of the ON/OFF coupler latching qubits and the first one of the administration latching qubits is also configured to couple to a second one of the ON/OFF coupler latching qubits of the first pair of the ON/OFF coupler latching qubits.

12. The superconducting quantum processor of claim 11 wherein a first one of the dummy latching qubits is configured to couple to the second one of the first pair of ON/OFF coupler latching qubits and the first one of the dummy latching qubits is configured to couple to a first one of the ON/OFF coupler latching qubits of a second pair of the ON/OFF coupler latching qubits.

13. The superconducting quantum processor of claim 10 wherein an output structure of at least one administration latching qubit is configured to couple to at least one element of the quantum processor.

14. The superconducting quantum processor of claim 13 wherein at least one element includes a computation qubit from the plurality of computation qubits.

15. The superconducting quantum processor of claim 14 wherein the coupling between an administration latching qubit and a computation qubit is mediated by a digital-to-analog converter.

16. The superconducting quantum processor of claim 10 wherein the coupling between any two of the administration latching qubits is sequentially mediated by at least two ON/OFF coupler latching qubits, and the coupling between any two ON/OFF coupler latching qubits is mediated by at least one of the dummy latching qubits.

17. The superconducting quantum processor of claim 16 wherein propagation of a signal through the superconducting shift register is governed by the ON/OFF coupler latching qubits.

18. A superconducting system comprising:
a computation qubit including at least one loop of superconducting material and at least one Josephson junction, wherein the computation qubit is configured to perform at least a portion of a computation;
a signal input structure; and
a latching qubit including a first loop of superconducting material and a compound Josephson junction that interrupts the first loop of superconducting material, the compound Josephson junction comprising a closed loop of superconducting material interrupted by at least two Josephson junctions, wherein the first loop of superconducting material and the compound Josephson junction form a closed superconducting current path, and wherein the compound Josephson junction of the latching qubit is communicatively coupleable to the signal input structure and the first loop of superconducting material of the latching qubit is communicatively coupleable to the computation qubit via a communicative coupling selected from the group consisting of inductive coupling and galvanic coupling.

19. The superconducting system of claim 18 wherein the signal input structure provides signals at a frequency that is at least one of an adiabatic frequency or a frequency below 20 GHz.

20. The superconducting system of claim 18 wherein the signal input structure includes a superconducting inductor positioned sufficiently proximate the compound Josephson junction of the latching qubit to inductively communicatively couple signals thereto.

21. A superconducting system comprising:
a first computation qubit including at least one loop of superconducting material and at least one Josephson junction, wherein the first computation qubit is configured to perform at least a portion of a computation; and
a superconducting shift register comprising a plurality of latching qubits arranged in a line of sequential coupling such that each latching qubit is inductively or galvanically coupled to at least one other adjacent latching qubit, wherein each respective latching qubit in the superconducting shift register includes a first loop of superconducting material and a compound Josephson junction that interrupts the first loop of superconducting material, the compound Josephson junction comprising a closed loop of superconducting material interrupted by at least two Josephson junctions, and wherein the first loop of superconducting material and the compound Josephson junction form a closed superconducting current path;
wherein the compound Josephson junction of each respective latching qubit in the superconducting shift register is inductively or galvanically coupled to a respective signal input structure and a first one of the latching qubits in the superconducting shift register is inductively or galvanically coupled to the first computation qubit.

22. The superconducting system of claim 21 wherein at least one signal input structure includes a superconducting inductor positioned sufficiently proximate the compound Josephson junction of a latching qubit to inductively couple signals thereto.

23. The superconducting system of claim 21, further comprising:
a second computation qubit including at least one loop of superconducting material and at least one Josephson junction, wherein the second computation qubit is configured to perform at least a portion of a computation and wherein a second one of the latching qubits in the superconducting shift register is inductively or galvanically coupled to the second computation qubit.

24. The superconducting system of claim 21 wherein each latching qubit in the superconducting shift register is inductively or galvanically coupled to at most two other adjacent latching qubits.

* * * * *